United States Patent [19]

Bollag

[11] Patent Number: 4,780,706

[45] Date of Patent: Oct. 25, 1988

[54] PET OR INFANT TRAINING DEVICE AND METHOD

[76] Inventor: Naomi Bollag, 1750 Ahi Ahi Rd., Kapa Island Kauai, Hi. 96746

[21] Appl. No.: 21,951

[22] Filed: Mar. 5, 1987

[51] Int. Cl.⁴ .......................................... G08B 21/00
[52] U.S. Cl. ..................................... 340/666; 340/573
[58] Field of Search ...................... 340/666, 626, 573; 119/29, 96, 106

[56] References Cited

U.S. PATENT DOCUMENTS

| | | | |
|---|---|---|---|
| 3,346,866 | 10/1967 | Bechtel | 340/666 |
| 3,604,958 | 9/1971 | Palini | 340/666 X |
| 3,753,421 | 8/1973 | Peck | 119/29 |
| 4,136,338 | 1/1979 | Antenore | 340/573 X |
| 4,258,359 | 3/1981 | McLamb | 340/546 |
| 4,347,505 | 8/1982 | Anderson | 340/666 |
| 4,359,726 | 11/1982 | Lewiner et al. | 340/666 |
| 4,551,713 | 11/1985 | Aossey | 340/666 |

Primary Examiner—Glen R. Swann, III
Attorney, Agent, or Firm—Hoffmann & Baron

[57] ABSTRACT

A training device adapted for use with pets includes a pressure mat that is sensitive to the pet's weight, and a sounder unit, which emits a loud, high frequency sound whenever and for as long as the pet steps on the pressure mat. The pressure mat is long enough to extend between or beyond door jambs, and wide enough to discourage the pet from jumping over or around the mat. The sounder unit includes an alarm, such as a piezo-ceramic transducer, that emits a loud, high frequency tone that is disturbing and startling to the pet.

3 Claims, 4 Drawing Sheets

PET OR INFANT TRAINING DEVICE AND METHOD

BACKGROUND OF THE INVENTION

1. Field of the Invention

This invention relates to a method and device for training pets or infants, and more particularly relates to a method and device for keeping the pet or infant away from a "restricted area" or confined to a preselected area.

2. Description of the Prior Art

With respect to pets in particular, one of the ways in which it is taught to keep an indoor pet confined to one room of the premises, or to prevent the pet from jumping on furniture, is to take affirmative action whenever and wherever such behavior by the animal is encountered. This can be done by "startling" the animal, such as by shouting, which is very effective, or by hitting the animal, each of which is a form of negative reenforcement of such behavior. In time, the animal or pet will learn that that particular behavior should not be done and will not be tolerated by its master or trainer, and that the consequences of such behavior will be punishment.

Although this conventional method of training may be effective in minimizing undesirable behavior in pets, there are certain disadvantages to its use.

First, it requires that the pet's trainer or owner must be present, especially at the initial stages of training, to discipline the pet whenever the unwanted behavior is encountered, that is, for effective negative reenforcement.

Second, it is annoying and aggravating for the pet owner or trainer to have to discipline the pet each time the behavior is encountered and until such behavior ceases.

Third, many pet owners are not good animal trainers, and employment of an experienced trainer may be prohibitively expensive.

Fourth, any action taken by the owner may have an adverse affect on the relationship between owner and pet, in that the pet will associate the negative reenforcement used to deter unwanted behavior, such as a shout or slap, with the owner.

Fifth, with approximately 80% of pets, the pet learns that negative reenforcement only occurs when the owner is present and, therefore, the pet believes that the undesirable behavior is prohibited only when the owner or someone else is present. Since no negative reenforcement is provided when no one is present, the undesirable behavior is reenforced.

Similar problems are encountered with the behaviorial training of infants or young children.

OBJECTS AND SUMMARY OF THE INVENTION

It is an object of the present invention to provide a training device for use with pets or infants which can provide unsupervised stimulus to deter unwanted behavior.

It is another object of the present invention to provide a training device which is adapted for training an infant or pet to remain within a confined area or stay out of a "restricted" area.

It is a further object of the present invention to provide a method for training an infant or pet using the training device of the present invention.

It is yet another object of the present invention to provide a training device and method for training pets and infants which overcome the inherent disadvantages of known methods.

In accordance with one aspect of the present invention, a training device adapted for use with pets includes a pressure mat that is sensitive to the pet's weight, and a "sounder" unit which emits a loud, high frequency sound whenever and for as long as the pet steps on the pressure mat. The pressure mat is preferably long enough to extend between or beyond door jambs, and wide enough to discourage the pet from jumping over or around the mat. The mat is also relatively thin so that it can be placed under a blanket or rug.

The sounder unit preferably includes an alarm, such as a piezo-ceramic transducer, that emits a loud, high frequency tone that is disturbing and startling to the pet.

The method of the invention is to create a loud, high frequency sound whenever unwanted behavior is to be discouraged, by using a pressure sensitive mat in conjunction with a sounder unit which emits such a sound in response to pressure applied to the mat.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENT

Figure 1:
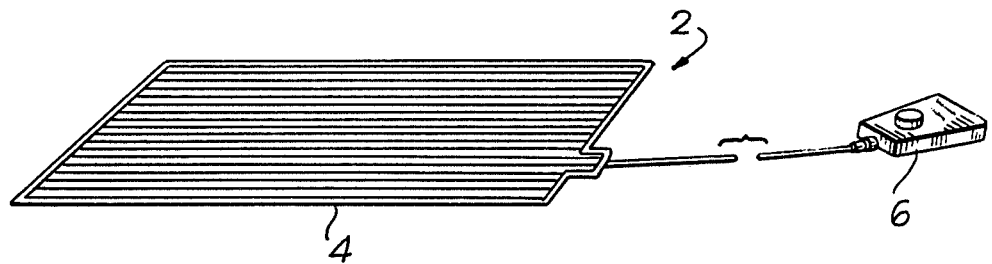
FIG. 1 is a perspective view of the training device in accordance with one form of the invention.

In accordance with one aspect of the present invention, a training device 2 adapted for use with pets or infants includes a pressure sensitive mat 4, and a "sounder" unit 6. The pressure sensitive mat 4 can be schematically represented as a normally open switch 7 which closes to complete an electrical path therethrough when pressure is applied to the mat.

There are a number of pressure sensitive mats which are available on the market and which are suitable for use in the present invention. One such mat is Model CVP switch mat manufactured by Tapeswitch Corporation of America, Farmingdale, N.Y.

The mat 4 preferably includes a conduit 8 containing two electrical wires 10, 12, and a male plug 14 connected to the two electrical wires 10, 12, for connection to the sounder unit 6.

Figure 2:
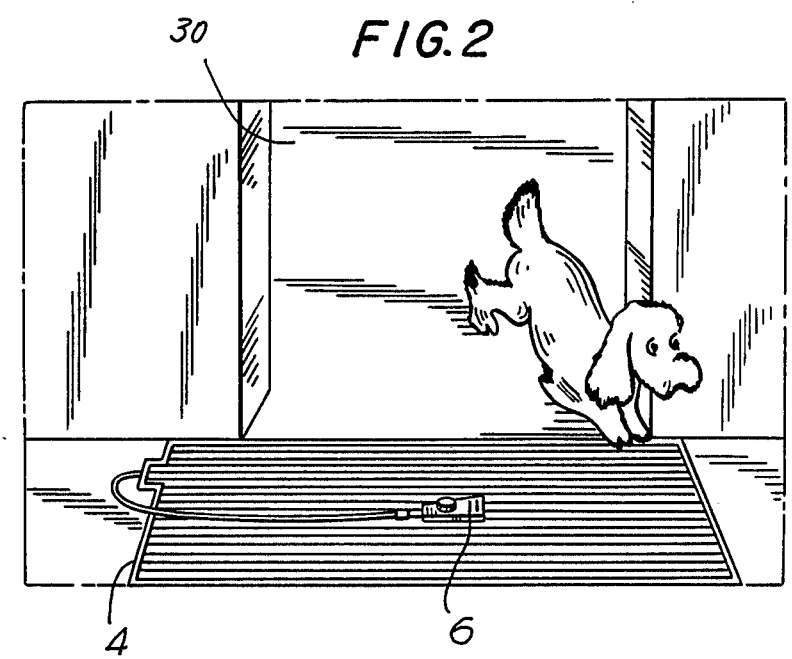
FIG. 2 is a perspective view of the training device shown in FIG. 1 positioned to discourage a pet from entering a room.
Figure 3:
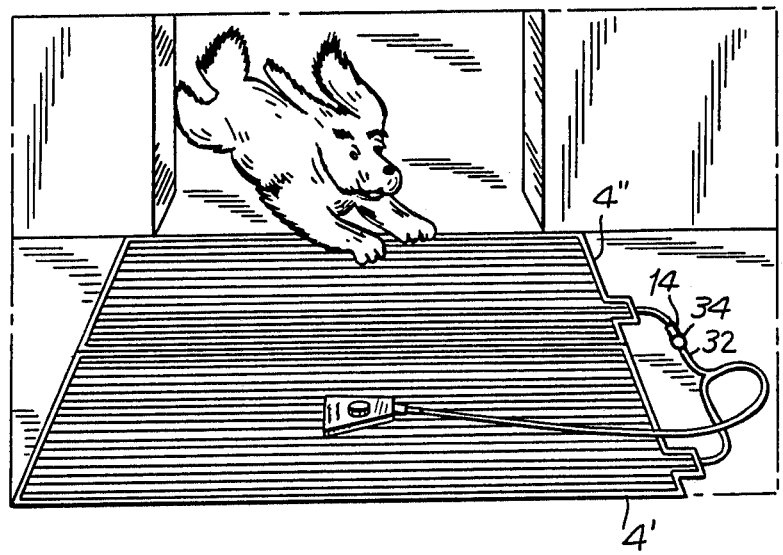
FIG. 3 is a perspective view of a multiple number of pressure mats coupled together to form a training device in accordance with the present invention.

The mat 4 is preferably selected to be sufficiently sensitive to pressure exerted by the paw of a small animal, such as a cat or puppy, and yet insensitive to a rug or blanket placed over the mat, and peferably is insensitive to even the sounder unit 6 which may be placed on top of the mat, as shown in FIGS. 2 and 3.

The sounder unit 6 basically includes a housing 16, a female receptacle 18 for receiving the plug 14 of the pressure mat, and an alarm 20, which is activated in response to pressure exerted on the pressure mat 4 by the pet or infant which completes the electrical circuit through the mat. The housing 16 preferably is also sufficiently large enough to house a battery 22 for energizing the alarm 20.

In a preferred form of the sounder unit 6 of the invention, two wires 24, 26 contained within the housing are connected to the receptacle 18 and electrically coupled with the two wires 10, 12 of the pressure mat 4 when the plug 14 is received by the receptacle 18. One wire 24 of the sounder unit is coupled to one polarity terminal of the battery 22, and the other wire 26 is connected to one terminal of the alarm 20. The other terminal of the alarm is coupled to the opposite polarity terminal of the battery via a wire 28.

The alarm 20 itself is preferably selected to emit a loud, high frequency sound, which is not only irritating to the pet, but also is startling.

There are various types of alarms which are suitable for use. These may include piezo-ceramic transducers or high frequency electromechanical buzzers, such as those used in smoke detectors. An example of each type of alarm mentioned above which may be suitable for use in the sounder unit is Model No. 273-060 (piezo-ceramic transducer) and Model No. 273-051 (buzzer), each of which is manufactured and sold by Radio Shack (Tandy Corporation).

The alarm 20 will activate when pressure is exerted on the pressure mat 4, and will deactivate when pressure is removed.

As shown in FIG. 2, the training device 2 of the present invention may be positioned at the doorway 30 leading to another room, for example, to keep a pet within one room or other confined area. The pressure mat 4 is preferably chosen with a length exceeding the width of the doorway, or about 48 inches, and a width, such as 36 inches, which will discourage the pet from attempting to jump over the mat.

For training larger animals, it may be desirable to connect two pressure mats 4', 4" together, such as illustrated by FIG. 3, and position them side-by-side widthwise to discourage jumping over the mats, or lengthwise to extend across a larger entranceway. Either the training devices may function independently of each other and comprise separate mats and sounder units, or may work together using a single sounder unit, as illustrated by FIG. 3. If the latter configuration is chosen, then one pressure mat 4' includes a branch conduit 32 coupled in parallel to its primary conduit 8, the branch conduit 32 including two wires connected to a second receptacle 34 for receiving the plug 14 of the second mat 4".

Figure 4:
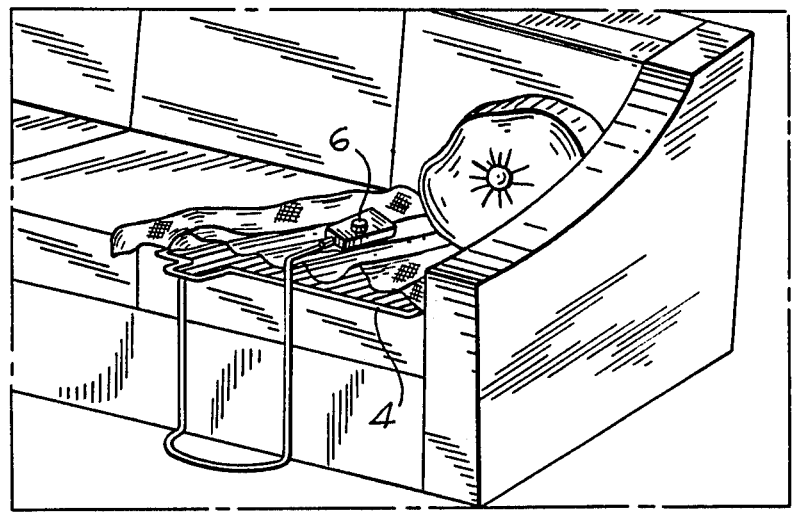
FIG. 4 is a perspective view of the training device shown in FIG. 1 positioned to keep a pet off furniture.

FIG. 4 illustrates how the training device may be used to keep pets off furniture. By placing the pressure mat 4 on the furniture, for example, a couch, and optionally covering the mat with a blanket 36, a pet will activate the alarm 20 every time it tries to jump onto the couch, and will learn to avoid the couch. Therafter, the pressure mat 4 may be removed while leaving the blanket 36 on the couch. Because the pet has associated the noise with the blanket 36, it will still avoid jumping on the furniture even without the presence of the training device.

Figure 5:
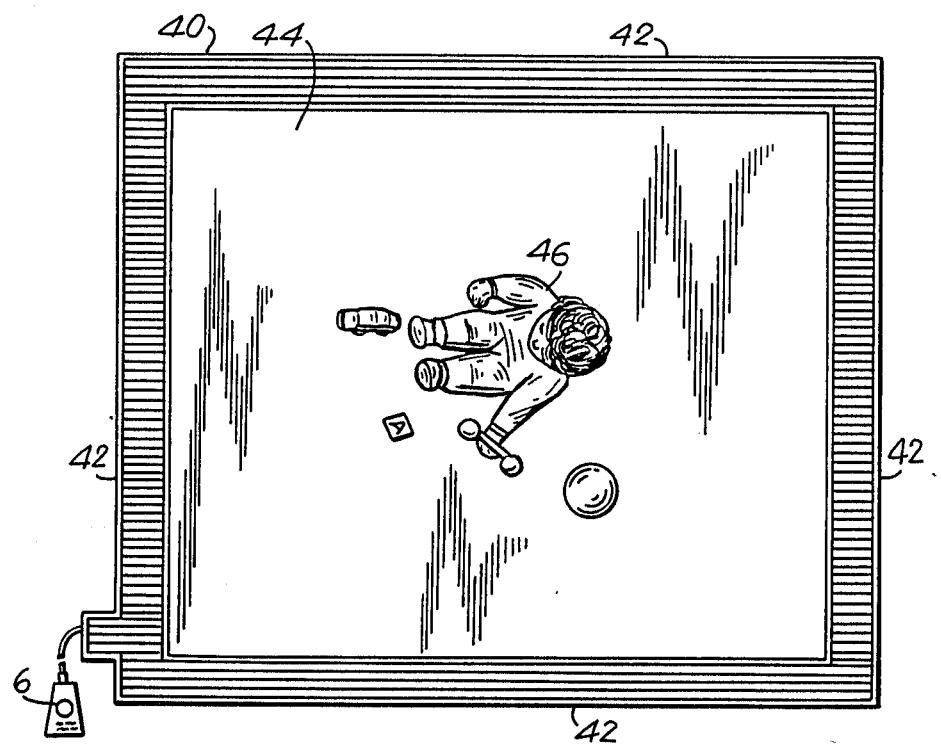
FIG. 5 is a plan view of a training device in accordance with a second form of the present invention.
Figure 6:
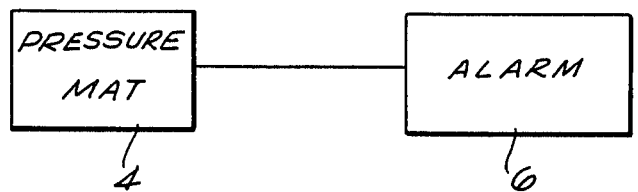
FIG. 6 is a block diagram of the training devices of FIGS. 1 and 5.
Figure 7:
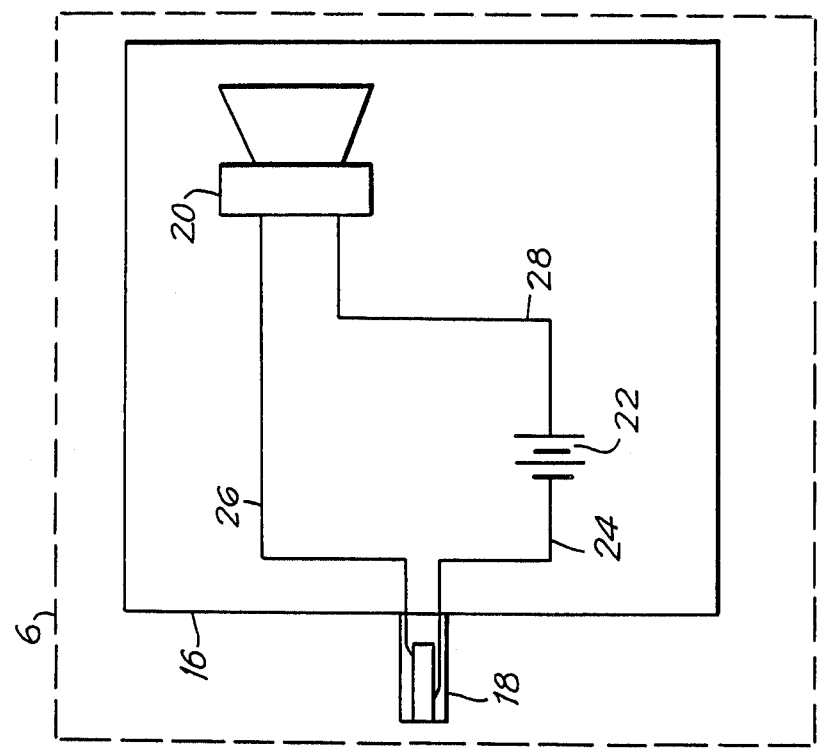
FIG. 7 is a pictorial/schematic diagram of the training devices of FIGS. 1 and 5.
Figure 7:
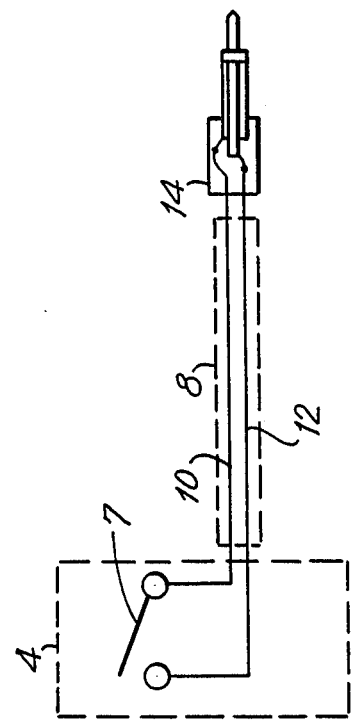

An alternative embodiment of the present invention is shown in FIG. 5 of the drawings and is adaptable for keeping infants or small children within a confined area, and to alert a supervising adult when the infant wanders out of the confined area.

The pressure mat 40 of this alternative embodiment is formed in the shape of a rectangle or square, with four integral or interconnected side mat sections 42, adjacent sections being positioned at right angles to the next adjacent section. The width of each side mat section 42 may be anywhere from six to twelve inches, and the length of each section 42 may be anywhere from four to six feet; the actual dimensions may vary in accordance with the age of the infant and his mobility. Thus, the mat 40 encloses an open central region 44 where an infant 46 may be placed.

The pressure mat 40 is coupled to a sounder unit 6, such as described with the previous embodiment, and the sounder unit emits a loud sound whenever pressure is applied to the pressure mat 40, in much the same way as with the previously described embodiment.

The embodiment illustrated in FIG. 5 is particularly useful for alerting a parent when a child wanders close to the edge of the "confined area" enclosed by the mat 40, and also tends to keep the child within the area, as the child's natural response to the loud noise emitted by the sounder unit 6 is to shy away from the border defined by the pressure mat 40.

The training device of the present invention is used to provide negative reenforcement of unwanted behavior by using the pressure mat to sense when the behavior to be deterred occurs, for example, jumping on furniture, and to establish that such behavior will have negative results (punishment), such as the loud and startling noise emitted by the sounder unit. The training device provides this reenforcement without the pet associating the noise with its master, and thus tends to allow the pet and owner to establish a closer relationship. In effect, the device and method of the present invention help teach the pet to avoid certain behavior without requiring the supervision of the pet owner.

The training devices of the present invention illustrated by FIGS. 1 and 5 are extremely portable and foldable, and may be conveninently transported in a compact form.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A training device adapted to define a constricted area and for keeping a child within the constricted area, which comprises:
    a foldable pressure sensitive electric switch mat adapted to provide an electrically conductive path therethrough in response to pressure exerted on the mat, the mat being formed to have an overall rectangular shape and having four side mat sections, adjacent sections being joined together at right angles to each other, the mat defining an enclosed open central region into which a child may be placed, with the mat surrounding the child on all sides; and a sounder unit coupled to the pressure sensitive mat, the unit including an alarm, the alarm being adapted to emit an audible signal in response to the child exerting pressure on the mat, the pressure sensitive mat being foldable and portable, and being adapted to be transported in a compact form.

2. A training device as defined by claim 1, wherein the width of each mat section is between about six and about twelve inches, and wherein the length of each mat section is from about four to about six feet, thereby providing the mat with an overall dimension of from about four feet to about six feet in length and width.

3. A training device adapted to define a constricted area and for keeping a child within the constricted area, which comprises:

a foldable pressure sensitive electric switch mat adapted to provide an electrically conductive path therethrough in response to pressure exerted on the mat, the mat being formed to define an enclosed open central region into which a child may be placed, with the mat surrounding the child on all sides; and a sounder unit coupled to the pressure sensitive mat, the unit including an alarm, the alarm being adapted to emit an audible signal in response to the child exerting pressure on the mat, the pressure sensitive mat being foldable and portable, and being adapted to be transported in a compact form

* * * * *